US006817937B1

(12) United States Patent
Merritt

(10) Patent No.: US 6,817,937 B1
(45) Date of Patent: Nov. 16, 2004

(54) SHELLFISH-OPENING TOOL

(76) Inventor: Richard A. Merritt, 2651 Bayview Way, Pensacola, FL (US) 32503

( * ) Notice: Subject to any disclaimer, the term of this patent is extended or adjusted under 35 U.S.C. 154(b) by 1 day.

(21) Appl. No.: 10/696,205

(22) Filed: Oct. 30, 2003

(51) Int. Cl.[7] ................................................. A22B 5/10
(52) U.S. Cl. ....................................................... 452/103
(58) Field of Search ............................ 7/106, 110, 125; 81/418; 452/2–5, 102–105

(56) References Cited

U.S. PATENT DOCUMENTS

| 505,835 A | * 10/1893 | Kulp et al. ..................... 7/101 |
| 717,206 A | * 12/1902 | Jacoby ......................... 452/103 |
| 2,434,550 A | * 1/1948 | Daniel ........................ 43/53.5 |
| 3,072,162 A | 1/1963 | Creed |
| 3,706,114 A | 12/1972 | Waechter |
| 3,777,333 A | * 12/1973 | Adams ........................... 452/3 |
| 3,811,153 A | 5/1974 | Rizzo |
| 4,139,760 A | 2/1979 | Banks |
| 4,590,644 A | 5/1986 | Maniscalco |
| 4,631,855 A | * 12/1986 | Ader ........................... 43/53.5 |
| 4,729,150 A | * 3/1988 | Breaux et al. .............. 452/105 |
| 5,108,343 A | * 4/1992 | Gilliam ......................... 452/6 |
| D348,184 S | 6/1994 | Neshat et al. |
| 5,482,500 A | 1/1996 | Boettner et al. |
| 6,202,518 B1 | * 3/2001 | Moffitt, Jr. et al. ........ 81/427.5 |
| 6,282,996 B1 | * 9/2001 | Berg et al. .................. 81/427.5 |

* cited by examiner

*Primary Examiner*—Thomas Price
(74) *Attorney, Agent, or Firm*—Donald R. Schoonover

(57) ABSTRACT

A tool is used to remove a shell from the meat of a shellfish and includes a handle section having a rip element on one handle and a serrated pad on the same handle. The tool further includes arcuate sections having teeth so the shell can be cracked using the tool in the manner of pliers. Once the shell is cracked, the rip element is inserted between the shell and meat and forced forward to separate the shell from the meat. The shellfish is held in a stable manner on the tool by the serrated pad.

1 Claim, 2 Drawing Sheets

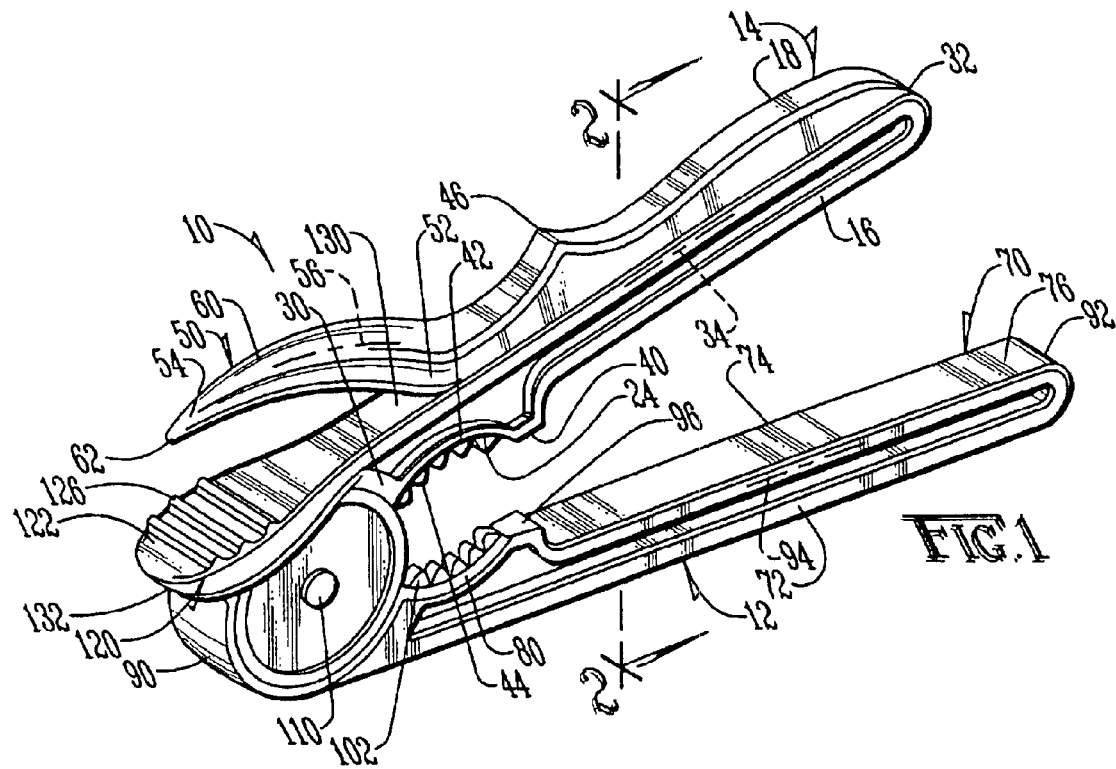
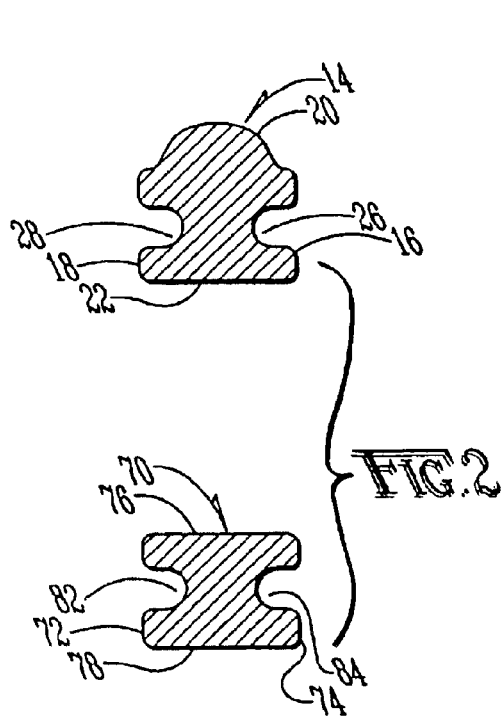
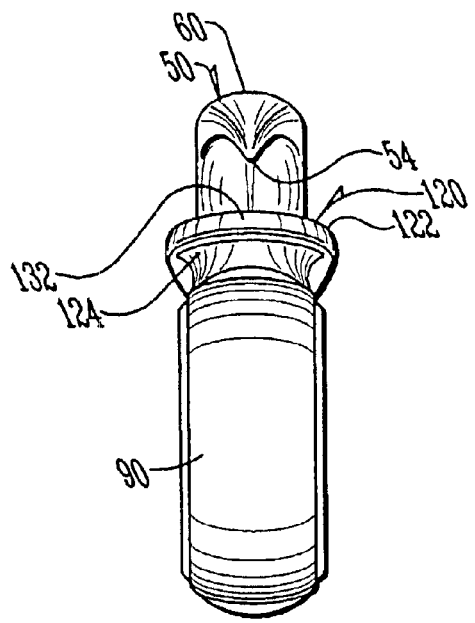

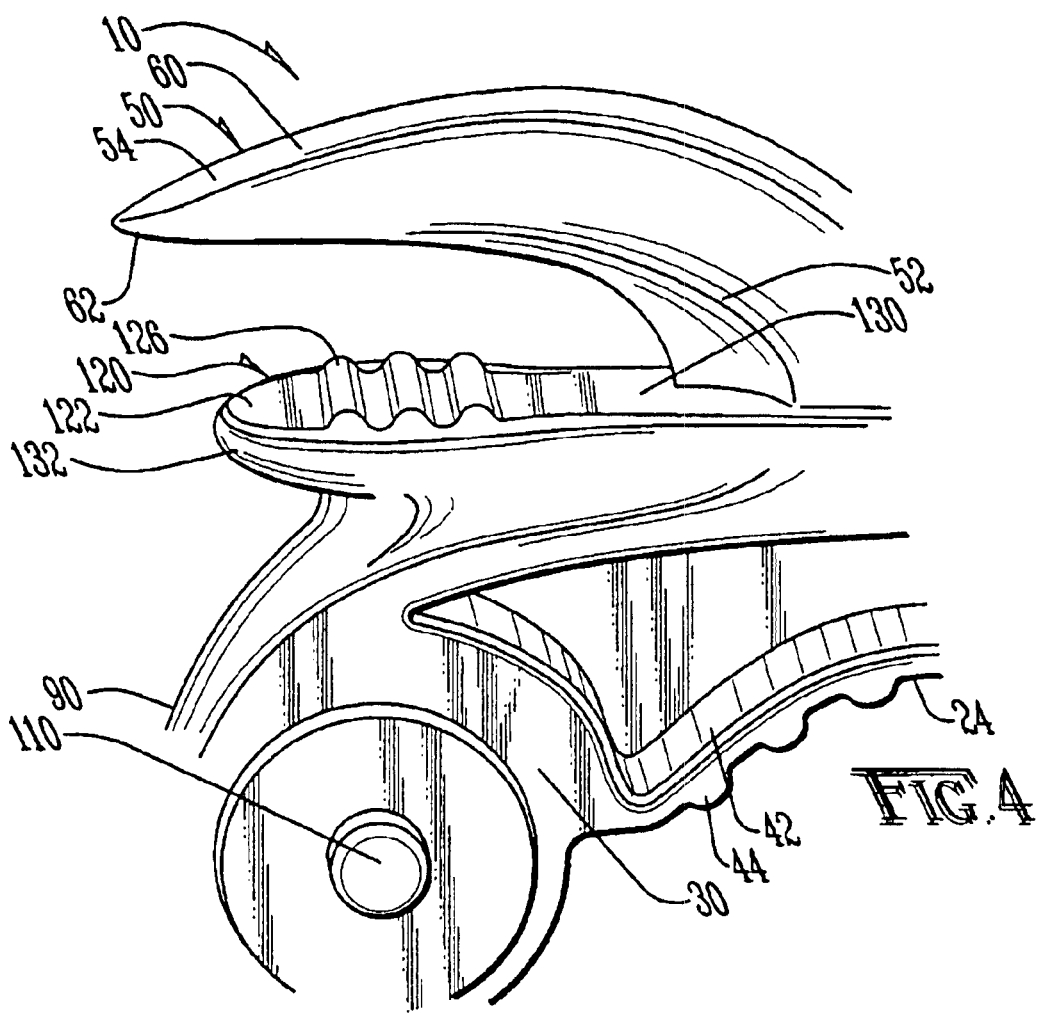

SHELLFISH-OPENING TOOL

BACKGROUND OF THE INVENTION

1. Field of the Invention

The present invention relates to the general art of kitchen utensils, and to the particular field of tools and implements used for eating.

2. Discussion of the Related Art

When eating shellfish, such as crablegs, oysters, lobsters, shrimp or the like, a person is often required to open a portion of the shellfish, such as the legs or the like. This often occurs at a dinner table. Many people struggle with this, and some people avoid eating such foods because of the struggle required to open the food. Some people try to use forks, knives or other table utensils to accomplish the task of opening such food. This can be cumbersome and messy.

Therefore, there is a need for a shellfish opening tool that is easy to use.

Opening shellfish may be especially difficult for a handicapped person or an elderly person or someone who may have arthritis in their hands. These people may be deprived of the enjoyment of eating shellfish unless someone opens the food for them.

Therefore, there is a need for a shellfish opening tool that is easy to use, even for someone who may have limited dexterity in their hands.

One of the problems associated with opening shellfish for eating is the removal of the shell from the meat. This may take more hand dexterity than a person possesses. The meat must be held in place while the shell is removed, all while not creating a large mess.

Therefore, there is a need for a shellfish opening tool that is easy to use and can be used to remove the shell from the meat.

Some eating utensils include a plurality of interconnected parts. These interconnected parts may separate during heavy use such as may occur during the shelling of shellfish. This may create a mess and may even break a plate if the eating utensil is heavy as may be required to open shellfish.

Therefore, there is a need for a shellfish opening tool that is stable and secure.

PRINCIPAL OBJECTS OF THE INVENTION

It is a main object of the present invention to provide a shellfish opening tool that is easy to use.

It is another object of the present invention to provide a shellfish opening tool that is easy to use, even for someone who may have limited dexterity in their hands.

It is another object of the present invention to provide a shellfish opening tool that is easy to use and can be used to remove the shell from the meat.

It is another object of the present invention to provide a shellfish opening tool that is stable and secure.

SUMMARY OF THE INVENTION

These, and other, objects are achieved by a shellfish opening tool that comprises a handle section which includes a first handle, a second handle and a pivot connection pivotally connecting the first handle to the second handle; a rip element that is one piece with the first handle of the handle section, the rip element including a pointed end that is spaced apart from the first handle; and a pad which is one piece with the first handle, the pad having a first surface, a plurality of serrations on the first surface of the pad, the first surface of the pad being oriented to face the pointed end of the rip element.

The shellfish opening tool embodying the present invention is easy to use, even if the user has impaired hand dexterity and can be used to remove the shell from the meat. The tool can be used both at home and in a restaurant. The tool is formed of several elements that are one-piece construction and thus the tool will be stable and secure during use. The shellfish is easily trapped between the rip element and the pad and will be held on the pad in a stable manner while the rip element is used to remove the shell from the meat. The shell can be cracked open using arcuate portions on the handles in the manner of a vise.

BRIEF DESCRIPTION OF THE DRAWING FIGURES

FIG. 1 is a perspective view of the shellfish opening tool embodying the present invention.

FIG. 2 is an elevational view taken along line 2—2 of FIG. 1.

FIG. 3 is a front end elevational view of the shellfish opening tool shown in FIG. 1.

FIG. 4 shows one end of the shellfish opening tool embodying the present invention.

DETAILED DESCRIPTION OF THE PREFERRED EMBODIMENT

Other objects, features and advantages of the invention will become apparent from a consideration of the following detailed description and the accompanying drawings.

Referring to the figures, it can be understood that the present invention is embodied in a shellfish opening tool 10. Shellfish tool 10 comprises a handle section 12 which is operated to hold the shellfish and to remove the shell from the meat for eating.

Handle section 12 includes a first handle 14 which is an upper handle in a use orientation shown in FIG. 1. The first handle 14 is one piece and includes side faces 16 and 18, a first face 20 which is a top face in the use orientation, and a second face 22 which is a bottom face in the use orientation. The first face 20 includes an arcuate portion 24 which is sized and shaped to securely engage a shell of a shellfish in the manner of pliers or the like. Each of the side faces 16, 18 of the first handle 14 includes a groove, grooves 26 and 28. The first handle 14 further includes a first end 30, a second end 32, and a longitudinal axis 34 which extends between the first end 30 of the first handle 14 and the second end 32 of the first handle 14. The first handle 14 further includes a projection 40 on the second face 22 of the first handle 14 and an arcuate portion 42 on the second face 22 of the first handle 14 adjacent to the projection 40 on the first handle 14. A plurality of teeth, such as tooth 44, are located on the second face 22 of the first handle 14 adjacent to the arcuate portion 42. A projection 46 is located on the first face 20 of the first handle 14.

A rip element 50 is positioned between the shell and the meat of a shellfish and is used to remove the shell from the meat. Rip element 50 is located on the first face 20 of the first handle 14 adjacent to the first end 30 of the first handle 14. Rip element 50 includes a proximal end 52 which is one piece with the first handle 14 for stability and security, a distal end 54, and a longitudinal axis 56 which extends between the proximal end 52 of the rip element 50 and the distal end 54 of the rip element 50. The longitudinal axis 56 of the rip element 50 extends in the direction of the longitudinal axis 34 of the first handle 14 but at an angle thereto. The rip element 50 further includes a body 60 and the distal end 54 of the rip element 50 is pointed to form pointed tip 62 which is sized and shaped to be easily inserted between the shell and the meat of a shellfish. The body 60 of the rip element 50 tapers from the proximal end 52 to the distal end 54 so that insertion of the rip element 50 between the shell and the meat of the shellfish will push the rip element 50 between the shell and the meat in a manner that separates the shell from the meat. The body 60 of the rip element 50 extends at an angle with respect to the longitudinal axis 34 of the first handle 14. The distal end 54 of the rip element 50 is spaced apart from the first end 30 of the first handle 14.

Handle section 12 further includes a second handle 70 which is a lower handle in the use orientation. Second handle 70 is one piece and includes side faces 72 and 74, a first face 76 which is a top face in the use orientation, and a second face 78 which is a bottom face in the use orientation. The first face 76 of the second handle 70 includes an arcuate portion 80 and each of the side faces 72, 74 of the second handle 70 includes a groove, 82 and 84. The second handle 70 further includes a first end 90, a second end 92 and a longitudinal axis 94 which extends between the first end 90 of the second handle 70 and the second end 92 of the second handle 70. The second handle 70 further includes a projection 96 on the first face 76 of the second handle 70 adjacent to arcuate portion 80. A plurality of teeth, such as tooth 102, are located on the first face 76 of the second handle 70 adjacent to the arcuate portion 80 of the second handle 70.

A pivot connection 110 pivotally connects the first end 30 of the first handle 14 to the first end 90 of the second handle 70 so the handles 14, 70 can be moved in the manner of pliers or the like.

Tool 10 further includes a pad 120 which is one piece with the first handle 14 of the handle section 12. The pad 120 is used to support the shellfish during the removal of the shell from the meat. The pad 120 includes a first surface 122 which is a top surface in the use orientation and a second surface 124 which is a bottom surface in the use orientation. The first surface 122 of pad 120 has a plurality of serrations, such as serration 126, thereon for ensuring that the shell and the meat do not slip relative to the tool. The pad 120 further includes a proximal end 130 and a distal end 132. First surface 122 of the pad 120 is oriented to face the distal end 54 of the rip element 50 so the shell and the meat will be separated while the shellfish is securely held in place.

Use of tool 10 will be understood by one skilled in the art from the foregoing. Therefore, the use of tool 10 will only briefly be discussed. A shell of a shellfish is separated from the meat of the shellfish by first holding the shellfish between arcuate surfaces 42 and 80 and operating the handle section 12 in the manner of pliers to crack the shell. Rip element 50 is then inserted between the shell and the meat and the tool is forced forward to insert the rip element 50 further between the shell and the meat. The shell will be separated from the meat, and the shellfish is held in a stable orientation with respect to the tool 10 by the serrations on pad 120 during the process. Tool 10 can be formed of stainless steel or other such material for long life and easy cleaning.

It is understood that while certain forms of the present invention have been illustrated and described herein, it is not to be limited to the specific forms or arrangements of parts described and shown.

What is claimed and desired to be covered by Letters Patent is as follows:

1. A shellfish opening tool comprising:

a) a handle section which includes
   (1) a first handle which is an upper handle in a use orientation, the first handle being one piece and including side faces, a first face which is a top face in the use orientation, a second face which is a bottom face in the use orientation, the first face including an arcuate portion, each of the side faces of the first handle including a groove, the first handle further including a first end, a second end, a longitudinal axis extending between the first end of the first handle and the second end of the first handle, the first handle further including a projection on the second face of the first handle, an arcuate portion on the second face of the first handle adjacent to the projection on the first handle, a plurality of teeth on the second face of the first handle adjacent to the arcuate portion, a projection on the first face of the first handle, and a rip element on the first face of the first handle adjacent to the first end of the first handle, the rip element including a proximal end, a distal end, a longitudinal axis extending between the proximal end of the rip element and the distal end of the rip element, the longitudinal axis of the rip element extending in the direction of the longitudinal axis of the first handle, the rip element further including a body, the distal end of the rip element being pointed and the body of the rip element tapering from the proximal end to the distal end, the body of the rip element extending at an angle with respect to the longitudinal axis of the first handle and the distal end of the rip element being spaced apart from the first end of the first handle,
   (2) a second handle which is a lower handle in the use orientation, the second handle being one piece and including side faces, a first face which is a top face in the use orientation, a second face which is a bottom face in the use orientation, the first face of the second handle including an arcuate portion, each of the side faces of the second handle including a groove, the second handle further including a first end, a second end, a longitudinal axis extending between the first end of the second handle and the second end of the second handle, the second handle further including a projection on the first face of the second handle adjacent to the arcuate portion of the second handle, and a plurality of teeth on the second face of the second handle adjacent to the arcuate portion of the second handle, and
   (3) a pivot connection pivotally connecting the first end of the first handle to the first end of the second handle; and b) a pad which is one piece with the first handle of said handle section, said pad including a first surface which is a top surface in the use orientation, a second surface which is a bottom surface in the use orientation, the first surface of said pad having a plurality of serrations thereon, said pad further including a proximal end and a distal end, the first surface of said pad being oriented to face the distal end of the rip element.

\* \* \* \* \*